H. C. LIGGETT.
DIRIGIBLE HEADLIGHT.
APPLICATION FILED FEB. 4, 1914.
1,120,066.
Patented Dec. 8, 1914.
2 SHEETS—SHEET 1.
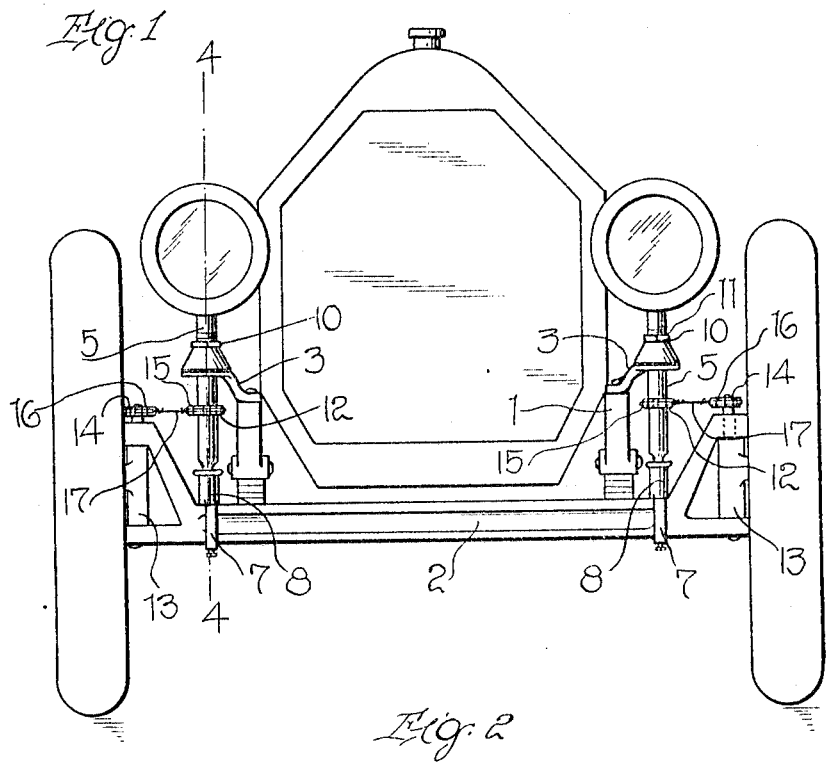
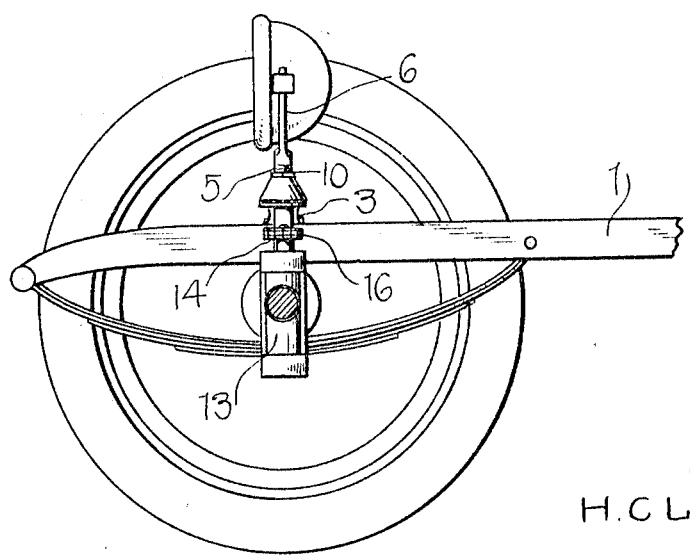
Inventor
H. C. LIGGETT H. C. LIGGETT.
DIRIGIBLE HEADLIGHT.
APPLICATION FILED FEB. 4, 1914.
1,120,066.
Patented Dec. 8, 1914.
2 SHEETS—SHEET 2.
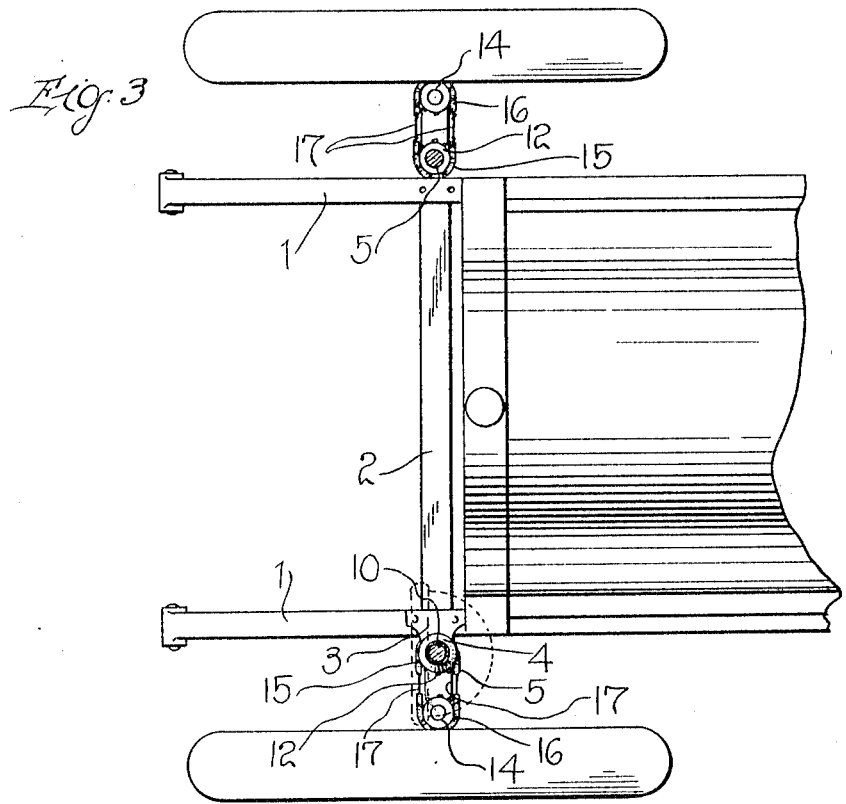
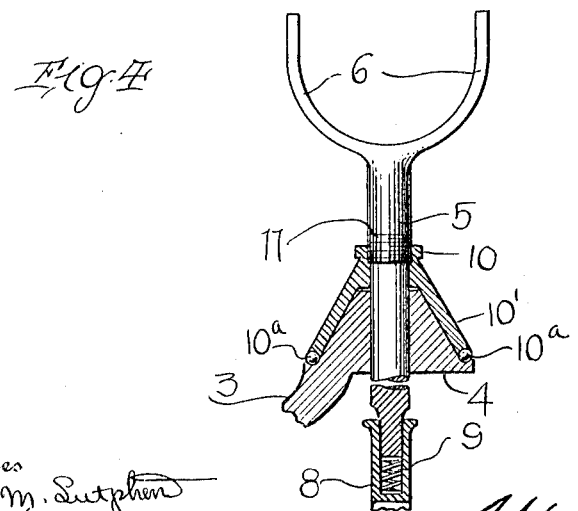
Witnesses
Robert M. Sutphen
A. L. Hied
Inventor
H. C. Liggett
By Watson E. Coleman
Attorney

UNITED STATES PATENT OFFICE.

HUGH C. LIGGETT, OF SALINEVILLE, OHIO.

DIRIGIBLE HEADLIGHT.

1,120,066.   Specification of Letters Patent.   Patented Dec. 8, 1914.

Application filed February 4, 1914. Serial No. 816,599.

*To all whom it may concern:*

Be it known that I, HUGH C. LIGGETT, a citizen of the United States, residing at Salineville, in the county of Columbiana and State of Ohio, have invented certain new and useful Improvements in Dirigible Headlights, of which the following is a specification, reference being had to the accompanying drawings.

This invention relates to new and useful improvements in dirigible headlights for automobiles and the primary object of the invention is to provide a device of this character which will operate effectively to direct the rays of light from the headlights of an automobile to the various parts of the road to which the front wheels of the vehicle are directed.

A further object of the invention resides in providing a device which is constructed to be an advanced improvement over the many other devices heretofore invented for this purpose.

Still another object of the invention resides in providing a device which is simple and durable in construction, inexpensive to manufacture and one which will be very efficient and useful in operation.

With these and other objects in view, the invention consists in the novel features of construction, combination and arrangement of parts as will be hereinafter referred to and more particularly pointed out in the specification and claims.

In the accompanying drawing forming a part of this application, Figure 1 is a front elevation of a device constructed in accordance with my invention and disclosing parts in section. Fig. 2 is a side elevation thereof. Fig. 3 is a plan view of the same partly in section. Fig. 4 is a vertical section as seen on line 4—4, Fig. 1.

In describing my invention, I shall refer to the drawing in which similar reference characters designate corresponding parts throughout the several views and in which 1 indicates the frame of an automobile of the usual or any preferred type and 2 the front axle thereof. Secured to the side bars of the frame 1 and projecting upwardly and outwardly therefrom, are the arms 3, the upper ends of which support the frusto-conical members 4 and disposed through these frusto-conical members are the vertical shafts or supporting arms 5, the upper ends of which are provided with lamp supporting brackets 6. Secured to the axle 2, are the clamping members 7 which carry the cups or the like 8 for the support of the lower reduced ends of the vertical shafts or supporting arms 5. Disposed in the bottom of these cup members 8 are coil springs 9 which yieldingly support said arms or shafts 5 in position. The frusto-conical members 4 provide guiding means for the shafts or arms 5 and in order to lock said shafts or arms 5 in a position against lateral movement during the travel of the vehicle, the clamping nuts or the like 10 are engaged with threaded portions 11 on the shafts or arms 5. The nuts 10 have the conical-like projections 10′ formed thereon which are designed to be received over the frusto-conical members 4 when the nuts 10 are turned home. The members 4 are provided with bearing balls 10$^a$ which receive the lower peripheral edge of the portions 10′ thereon and it will be seen from this construction that the shafts 5 will be prevented from any lateral or tortional sway during the operation of the vehicle and, at the same time will be capable of being rotated with respect to the members 4.

My invention primarily contemplates the provision of a means for the partial rotation of these members 5 upon the disposition of the front wheels of the vehicle in one direction or the other and, in order to accomplish this result, the lower ends of the arms or shafts 5 are first provided with sprockets 12. The upper ends of the steering knuckles 13, adjacent the outer ends of the axle, are also provided with sprockets 14, which are substantially the same size as the sprockets 12. Trained over the sprockets 12 are the chain sections 15, while additional chain sections 16 are trained over the sprockets 14 and said chain sections 15 and 16 are connected together by means of the wires or other flexible connections 17, whereby to form an endless connection between the sprockets 12 and 14. The wires or other flexible connections 17, however, permit a certain give or yielding action between the chain sections which is obviously advantageous in a device of this character.

From the foregoing it will be seen that as the steering knuckles are directed to one position or the other, as the steering wheel is turned, the sprockets 14 in connection with said knuckles will also be turned therewith to cause the shafts or arms 5 which support the lamps to also be partially rotated in the same direction. Thus the rays of light directed from the lamps carried on the brackets 6 on said arms 5 will be directed in the path of travel according to the directing of the front wheels. It will be seen, however, that in the traveling of the vehicle, the jars incident thereto will be compensated for so far as the shafts 5 are concerned, by means of the coil springs 9 in the bottom of the cup members 8.

From the foregoing it will be seen that I have provided a simple, inexpensive and efficient means for carrying out the objects of the invention and while I have particularly described the elements best adapted to perform the functions set forth, it is obvious that various changes in form, proportion and in the minor details of construction may be resorted to without departing from the spirit or sacrificing any of the principles of the invention.

Having thus described this invention, what I claim is:—

1. In a dirigible headlight for automobiles, the combination with a frame, an axle, and steering knuckles carried on the latter; of a pair of vertical shafts disposed on the outer sides of the side bars of said frame, means for yieldingly supporting the lower ends of said shafts on said axle, upwardly and outwardly extending arms carried on the side bars of said frame, frusto-conical bearing members carried on the outer ends of said arms and having said shafts loosely disposed therethrough, said shafts being threaded at points thereon adjacent the frusto-conical members, means in engagement with the threaded portions of said shafts and also engaged with said frusto-conical members to secure said shafts against lateral movement and admit of rotation thereof with respect to said frusto-conical members, lamp brackets carried on the upper ends of said shafts, and means connected with the lower ends of said shafts and said knuckles to actuate the former upon the actuation of the latter.

2. In a dirigible headlight for automobiles, the combination with a frame, an axle, and steering knuckles carried on said axle; of a pair of vertical shafts disposed on the outer sides of the side bars of said frame, means for yieldingly supporting the lower ends of said shafts on said axle, upwardly and outwardly extending arms secured to the side bars of said frame, frusto-conical bearing members carried on the outer ends of said arms and receiving the vertical shafts therethrough, said vertical shafts being threaded at points adjacent the bearing members, bearing balls provided on said frusto-conical bearings, nuts engaged with the threaded portions of said shafts, and disposed in binding engagement with the outer faces of said frusto-conical bearings to secure said vertical shafts against loose movement, and simultaneously admit of the rotation thereof with respect to said bearings, lamp brackets carried on the upper ends of said shafts, and means in connection with the lower ends of said shafts and said steering knuckles to actuate the former upon the actuation of the latter.

In testimony whereof I hereunto affix my signature in the presence of two witnesses.

HUGH C. LIGGETT.

Witnesses:
 JETTA McCORMICK,
 S. E. McCORMICK.

Copies of this patent may be obtained for five cents each, by addressing the "Commissioner of Patents, Washington, D. C."